US012775370B2

(12) United States Patent
Hou et al.

(10) Patent No.: US 12,775,370 B2
(45) Date of Patent: Oct. 27, 2026

(54) INFORMATION PROCESSING METHOD, DEVICE, ELECTRONIC APPARATUS, AND STORAGE MEDIUM

(71) Applicant: Beijing Zitiao Network Technology Co., Ltd., Beijing (CN)

(72) Inventors: Siyu Hou, Beijing (CN); Long Qin, Beijing (CN); Zhaojun Wang, Beijing (CN); Yao Wang, Beijing (CN); Chaodong Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 340 days.

(21) Appl. No.: 18/395,380

(22) Filed: Dec. 22, 2023

(65) Prior Publication Data

US 2024/0211114 A1 Jun. 27, 2024

(30) Foreign Application Priority Data

Dec. 27, 2022 (CN) ......................... 202211691069.4

(51) Int. Cl.
*G06F 3/048* (2013.01)
*G06F 3/0482* (2013.01)
*G06F 3/0484* (2022.01)

(52) U.S. Cl.
CPC .......... *G06F 3/0484* (2013.01); *G06F 3/0482* (2013.01)

(58) Field of Classification Search
None
See application file for complete search history.

(56) References Cited

U.S. PATENT DOCUMENTS

2014/0337071 A1* 11/2014 Stiffler ................ G06F 3/04847 705/7.13
2017/0329506 A1* 11/2017 Laetham ................ G06F 9/451
2020/0151630 A1* 5/2020 Shakhnovich ....... G06Q 10/063
2023/0410049 A1* 12/2023 Joseph .............. G06Q 10/0633

FOREIGN PATENT DOCUMENTS

CN 113296906 A 8/2021
CN 114331331 A 4/2022

OTHER PUBLICATIONS

China Patent Application No. 202211691069.4; Office Action; dated Feb. 13, 2026; 10 pages.

* cited by examiner

*Primary Examiner* — Thanh T Vu
(74) *Attorney, Agent, or Firm* — BakerHostetler

(57) ABSTRACT

The present disclosure provides an information processing method, device, electronic apparatus, and storage medium, including: displaying at least one workflow item on a current page in response to a workflow creation operation, and determining a selected item based on a first selection operation for the at least one workflow item, wherein the at least one workflow item includes a corresponding processing personnel; generating condition options corresponding to each selected item on the current page in response to a confirmation of the selected item, and determining an item condition for each selected item based on a second selection operation for the condition options; and generating and displaying a workflow preview interface on the current page based on the selected item and the item condition.

20 Claims, 8 Drawing Sheets

INFORMATION PROCESSING METHOD, DEVICE, ELECTRONIC APPARATUS, AND STORAGE MEDIUM

CROSS-REFERENCE TO RELATED APPLICATION

The present application claims priority to Chinese Patent Application No. 202211691069.4, filed on Dec. 27, 2022, which is incorporated herein by reference in its entirety.

TECHNICAL FIELD

The present disclosure relates to the field of computer technology, in particular to an information processing method, device, electronic apparatus, and storage medium.

BACKGROUND

In scenarios such as internal and inter team collaborations within companies and enterprises, it is necessary to handle some multi-person collaboration matters or matters that require for multi-person supervision (for example, a leave application item requires for multi-person approval).

However, when creating a processing flow for these matters, it is usually necessary for a creator and a manager to communicate and negotiate for multiple times, then the manager will inform a handler to handle these matters, and the creator will publish these matters. The entire process is lengthy, with high communication and development costs, which affects the overall efficiency.

SUMMARY

In view of this, the present disclosure provides an information processing method, device, electronic apparatus, and storage medium.

Based on the objective above, the present disclosure provides an information processing method, including:

- displaying at least one workflow item on a current page in response to a workflow creation operation, and determining a selected item based on a first selection operation for the at least one workflow item, wherein each of the at least one workflow item includes a corresponding processing personnel;
- generating condition options corresponding to each selected item on the current page in response to a confirmation of the selected item, and determining an item condition for each selected item based on a second selection operation for the condition options; and
- generating and displaying a workflow preview interface on the current page based on the selected item and the item condition.

Based on the same concept, the present disclosure further provides an information processing device, including:

- a first determination module, configured to display at least one workflow item on a current page in response to a workflow creation operation, and determine a selected item based on a first selection operation for the at least one workflow item, wherein the at least one workflow item includes a corresponding processing personnel;
- a second determination module, configured to generate condition options corresponding to each selected item on the current page in response to a confirmation of the selected item, and determine an item condition for each selected item based on a second selection operation for the condition options; and
- a generation module, configured to generate and display a workflow preview interface on the current page based on the selected item and the item condition.

Based on the same concept, the present disclosure further provides an electronic apparatus including a memory, a processor, and a computer program stored in the memory and executable on the processor, wherein the processor is configured to implement the method described in any of the above in case of executing the computer program.

Based on the same concept, the present disclosure further provides a non-transient computer-readable storage medium including computer instructions stored therein, wherein the computer instructions are configured to enable the non-transient computer to implement the method described in any of the above.

From the above, it can be seen that the information processing method, device, electronic apparatus, and storage medium provided in the present disclosure includes: displaying at least one workflow item on a current page in response to a workflow creation operation, and determining a selected item based on a first selection operation for the at least one workflow item, wherein each of the at least one workflow item includes a corresponding processing personnel; generating condition options corresponding to each selected item on the current page in response to a confirmation of the selected item, and determining an item condition for each selected item based on a second selection operation for the condition options; and generating and displaying a workflow preview interface on the current page based on the selected item and the item condition. According to the present disclosure, it quickly generates a workflow by allowing the operator to directly select workflow items and corresponding item conditions, thereby eliminating the need of collaborative processing, shortening the overall duration of the workflow generation process, saving the working time and communication costs, and improving the processing efficiency of the workflow.

BRIEF DESCRIPTION OF THE DRAWINGS

To illustrate the technical solutions in embodiments of the present disclosure or the related art more clearly, the accompanying drawings which are required to describe the embodiments or the related art will be briefly described below. Apparently, for one of ordinary skilled in the art, other drawings can be obtained on the basis of these drawings without any creative work.

DETAILED DESCRIPTION

Figure 1:
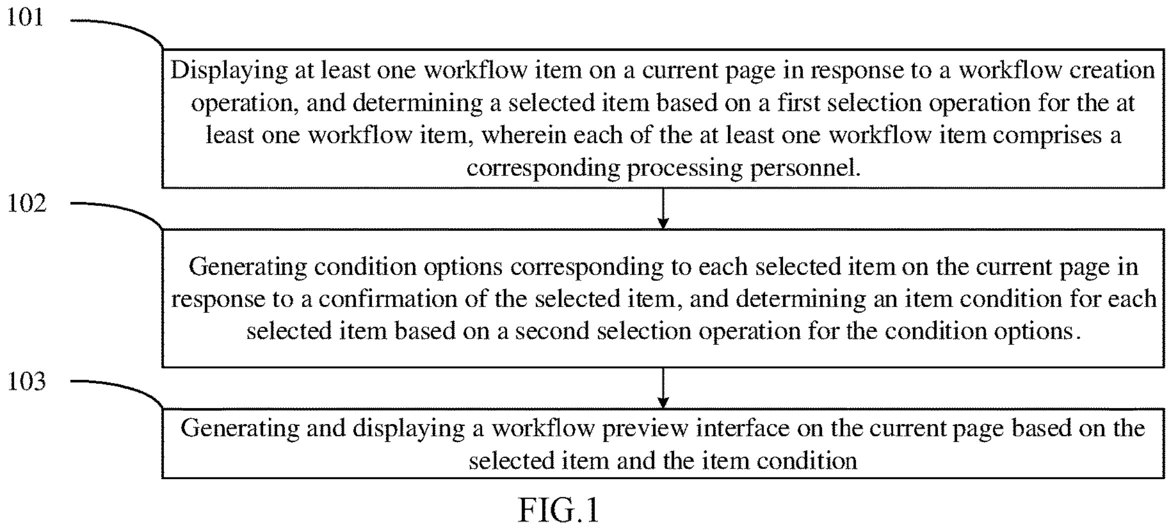
FIG. 1 is a flowchart of an information processing method provided in the embodiment of the present disclosure.

In order to make the objectives, technical solutions, and advantages of the present disclosure more apparent, the following is a detailed explanation of the present disclosure in connection with specific embodiments and with reference to the accompanying drawings.

It can be understood that before using the technical solutions disclosed in various embodiments of the present disclosure, users should be informed of the types, application scope and application scenarios of personal information involved in the present disclosure in an appropriate way according to relevant laws and regulations and be authorized by users.

For example, in response to receiving the user's active request, prompt information is sent to the user to clearly remind the user that the operation requested by the user will require obtaining and using the user's personal information. Therefore, the user can independently choose whether to provide personal information to software or hardware such as electronic apparatus, application programs, servers or storage medium that perform the operation of the technical solution of the present disclosure according to the prompt information.

As an optional but non-limiting implementation, in response to receiving the user's active request, the way to send the prompt information to the user can be, for example, a pop-up window, in which the prompt information can be presented in text. In addition, the pop-up window can also carry a selection control for the user to choose "agree" or "disagree" to provide personal information to the electronic apparatus.

It can be understood that the above-mentioned process of notifying and obtaining user authorization is only schematic and not intended to limit the implementation of the present disclosure, and other ways to meet relevant laws and regulations can also be applied to the implementation of present disclosure.

It can be understood that the data involved in the technical solution (including but not limited to the data itself, the acquisition or use of the data) shall comply with the requirements of corresponding laws, regulations and relevant regulations.

In order to make objects, technical solutions and advantages of the embodiments of the present specification apparent, the specification will be described in a clearly and fully understandable way in connection with the drawings related to the specific embodiments.

It is to be noted that, unless otherwise defined, all the technical and scientific terms used herein have the same meanings as commonly understood by one of ordinary skill in the art to which the present disclosure belongs. The terms "first," "second," etc., which are used in the description and the claims of the present disclosure for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

As mentioned in the background section, in scenarios such as internal and inter team collaborations, some workflows often arise, for example, approval matters for various regulations, such as contract approval, application approval, altering approval, and so on. A typical workflow is often accompanied by the generation of working documents, for example, leave application approval items are usually accompanied by the publication or generation of working documents of the leave regulations. Generally, it's the author or creator of a working document who knows best what kind of approval items are needed for the corresponding regulation. However, the approval generally requires specialized managers to confirm and establish. As a result, in related technologies, the author needs to communicate and coordinate with the managers for multiple times to complete the creation of the working document and corresponding approval items. The entire process is lengthy, and the communication and development costs are expensive, which reduce the overall efficiency.

Considering the above practical situation, the embodiment of the present disclosure provides an information processing solution. According to the present disclosure, it quickly generates a workflow by allowing the operator to directly select workflow items and corresponding item conditions, thereby eliminating the need of collaborative processing, shortening the overall duration of the workflow generation process, saving the working time and communication costs, and improving the processing efficiency of the workflow.

As shown in FIG. 1, it is a flowchart of an information processing method provided by the present disclosure. This method specifically includes:

Step 101, displaying at least one workflow item on a current page in response to a workflow creation operation, and determining a selected item based on a first selection operation for the at least one workflow item, wherein each of the at least one workflow item comprises a corresponding processing personnel.

In some embodiments, the workflow can be understood as the approval process of a certain regulation. When an operator wants to create a workflow, he/she can enter a workflow creation page through specific interfaces, that is, to perform the workflow creation operation. The creation page is exactly the current page. These interfaces can be set in the operator's working page in the form of links or buttons with built-in links. When the operator wants to create a workflow, he/she can trigger these interfaces to complete the creation operation and jump to the creation page (the current page) from the working page.

Figure 2:
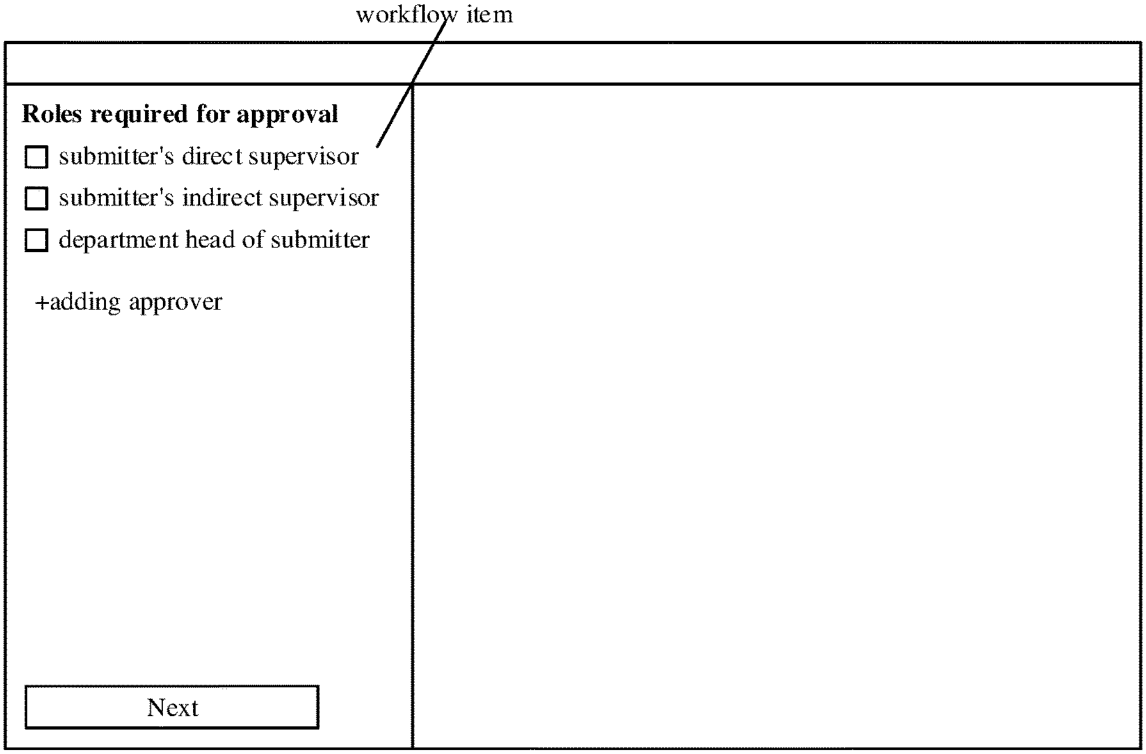
FIG. 2 is a schematic diagram of workflow items displayed on a current page provided by the embodiment of the present disclosure.

The approval workflow will be described by way of example. Referring to FIG. 2, it is a schematic diagram of the current page. At least one workflow item can be set on the current page, where the workflow usually involves multiple persons who are cooperating to complete the workflow. For example, a leave approval may require for permission of multiple persons, and a leave application item can be operated only by the submitter of the application. Thus, when creating a workflow, the first step is to select the processing personnel, which means that the workflow items here need to include the corresponding processing personnel, so that the operator can firstly select the workflow item of processing personnel on the current page, that is, performing the first selection operation. In specific embodiments, multiple preset options can be set on the current page, such as the superior of the submitter (the superior of the person applying for leave during the leave approval), the department head of the submitter (the department head of the person applying for leave during the leave approval), and so on. Of course, the workflow items can also be set with custom options for the operator to make specific workflow item settings based on the specific workflow.

Then, the operator can select one or more of these workflow items, and the item as selected is referred to as the selected item. In some embodiments, the selected workflow item can be displayed differently by setting a check area in front of or following the workflow item, or by highlighting or by other ways.

Step 102, generating condition options corresponding to each selected item on the current page in response to a confirmation of the selected item, and determining an item condition for each selected item based on a second selection operation for the condition options.

Figure 3:
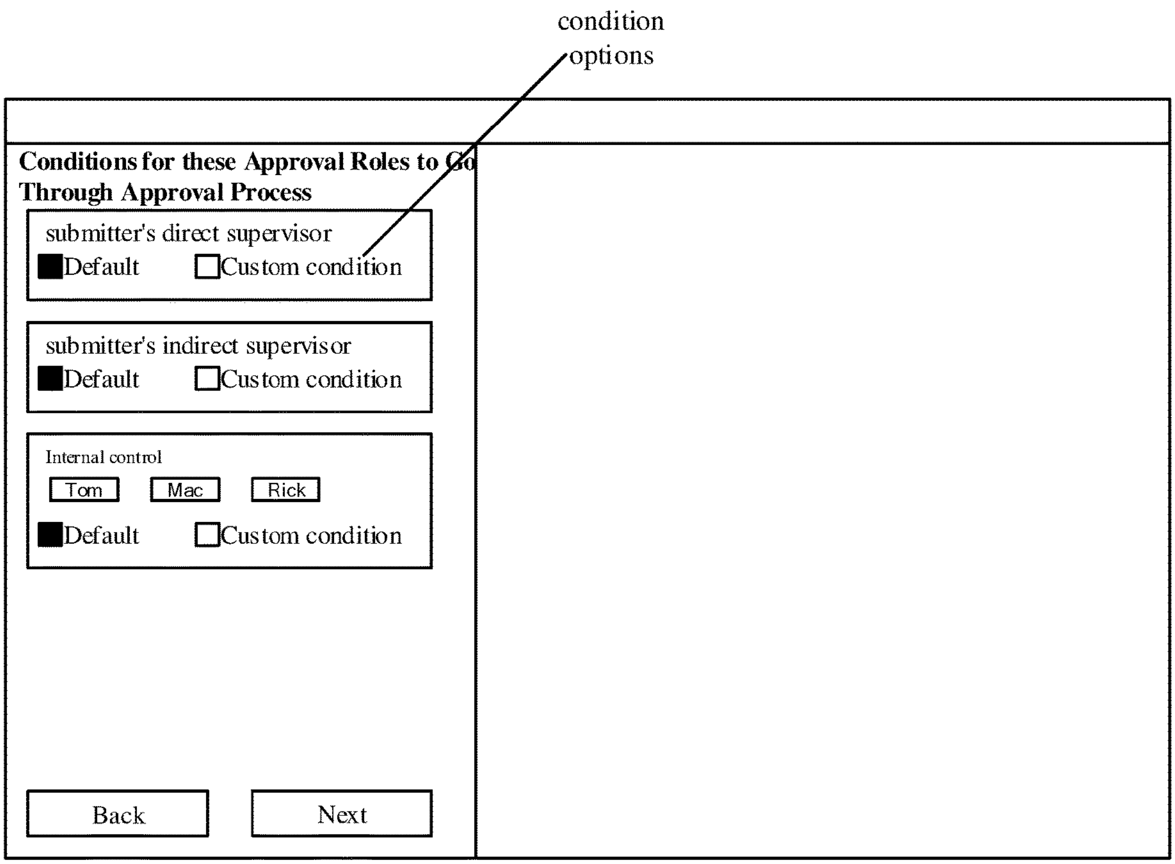
FIG. 3 is a schematic diagram of selected items and condition options displayed on a current page provided by an embodiment of the present disclosure.

In some embodiments, when the operator believes that the workflow item has been selected, a confirmation operation can be performed. As shown in FIG. 2, a selection area of "Next Step" can be set on the current page. When the operator triggers in this area, it is considered that the operator has confirmed the selected item. Then, as the selected item has been determined, the unselected workflow items can be removed from the current page, and only the selected item is displayed. Furthermore, for each selected item, condition options are generated. The condition options are conditions under which the corresponding workflow item needs to be processed. The approval workflow will be described by way of example. As shown in FIG. 3, during the creation process of the approval workflow, it is determined under what conditions the processing personnel corresponding to the selected item will approve. It can preset multiple condition options, such as approval by default, approval with the consent of the submitter's superior, approval under self-defined conditions, etc. The operator can select from these condition options for each selected item, that is, performing a second selection operation to set a corresponding condition for each selected item, and the selected condition option is referred to as the item condition. In specific embodiments, after generating the condition options for each selected item, one condition option can be selected by default to prevent the operator from missing the selection. In some embodiments, the selected condition option can be displayed differently by setting a check area in front of or following the condition option, or by highlighting or other ways.

Then, after the operator completes the selection of the item condition, a confirmation operation can also be performed. As shown in FIG. 3, a selection area of "Next Step" can also be set on the current page. When the operator triggers in this area, it is considered that the operator has confirmed the item condition of the selected item.

Step 103, generating and displaying a workflow preview interface on the current page based on the selected item and the item condition.

Figure 4:
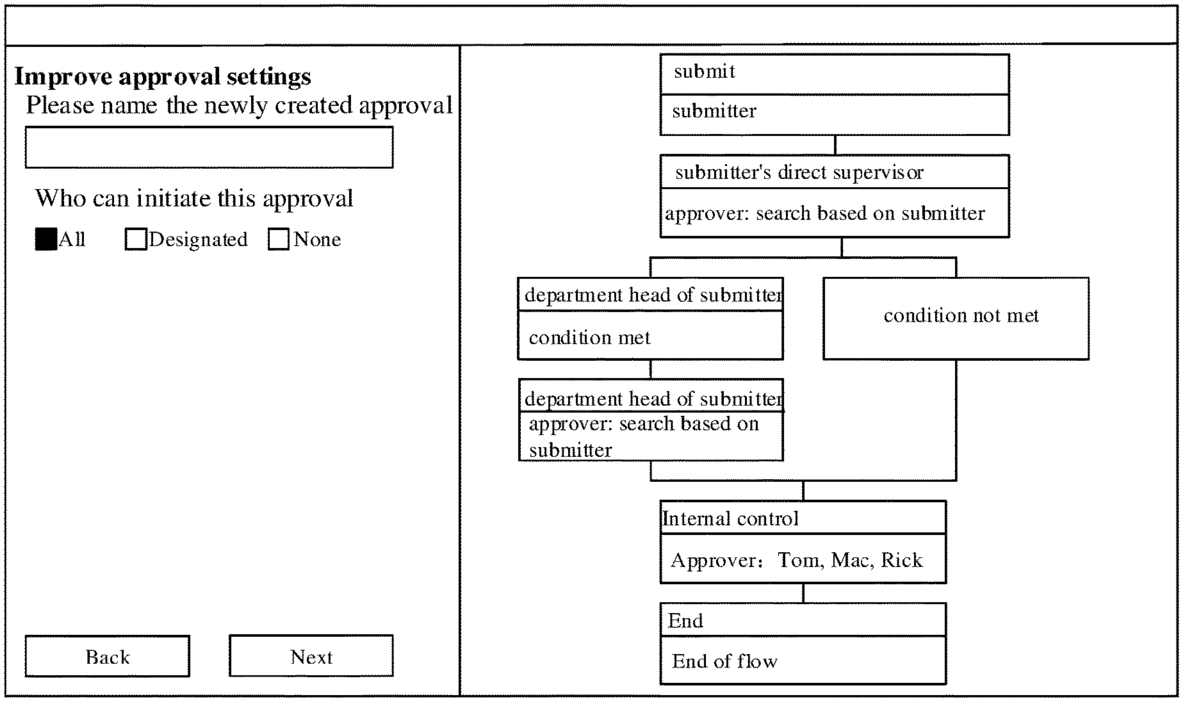
FIG. 4 is a schematic diagram of a workflow preview interface displayed on a current page provided by an embodiment of the present disclosure.

In some embodiments, after the operator completes the setting and selection of the selected item and corresponding item condition, a preview interface of the workflow can be generated based on the selected item and corresponding item condition. The approval workflow will be described by way of example. As shown in FIG. 4, a preview interface in the form of a flowchart can be generated based on the selected item and corresponding item condition for the operator to view and confirm. Of course, the preview interface can also be set as a table or a form according to specific application scenarios. In the end, the operator can flexibly set the selected items and item conditions according to their own ideas without the need of consulting and communicating with other personnels to determine the selected items, which reduces the communication time and improves the overall efficiency.

From the above, it can be seen that an information processing method of the embodiment of the present disclosure includes: in response to a workflow creation operation, displaying at least one workflow item on a current page, and determining a selected item based on a first selection operation for the at least one workflow item, wherein the workflow item includes a corresponding processing personnel; in response to a confirmation of the selected item, generating condition options corresponding to each selected item on the current page, and determining an item condition for each selected item based on a second selection operation for the condition options; and generating and displaying a workflow preview interface on the current page based on the selected item and the item condition. According to the present disclosure, it quickly generates a workflow by allowing the operator to directly select the workflow items and corresponding item conditions, thereby eliminating the need of collaborative processing, shortening the overall duration of the workflow generation process, saving the working time and communication costs, and improving the processing efficiency of the workflow.

In some embodiments, the workflow items include a newly created item; the displaying the at least one workflow item on the current page includes: generating an item editing interface in response to a triggering of a newly created item; in response to an addition operation on the item editing interface, acquiring personnel information corresponding to the addition operation, and generating a new workflow item on the current page based on the personnel information.

Figure 5:
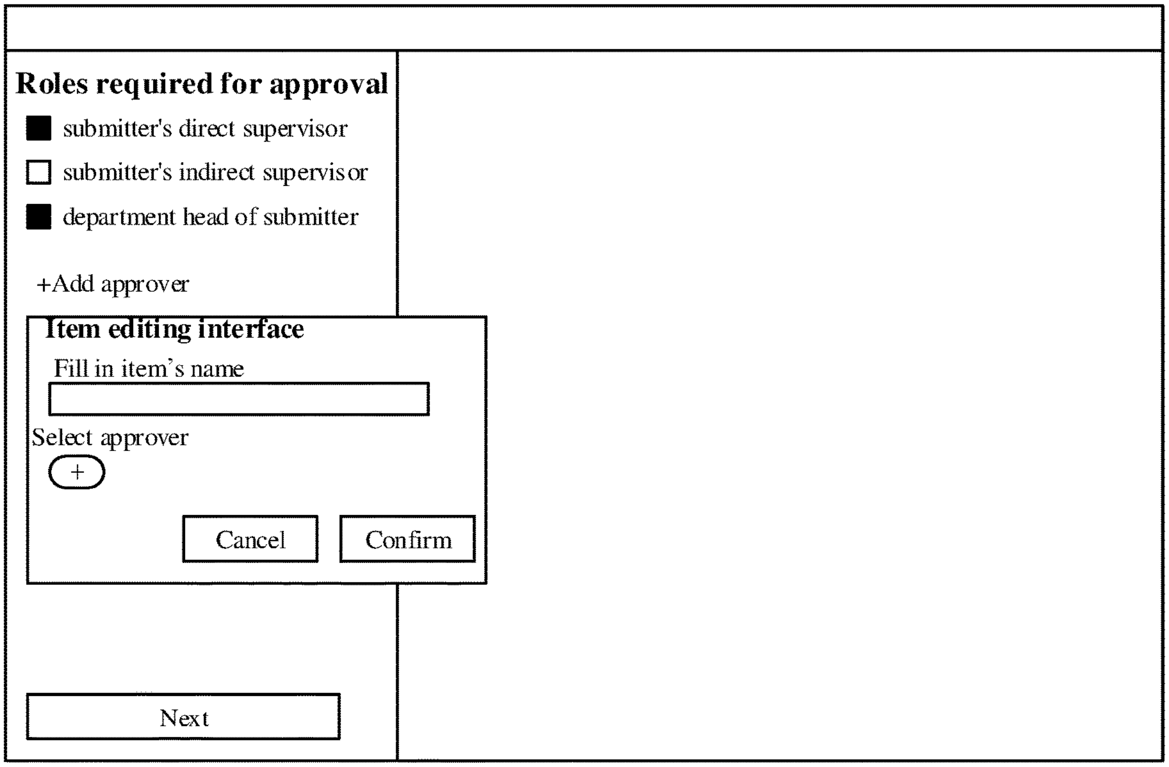
FIG. 5 is a schematic diagram of an item editing interface generated in a current page provided by an embodiment of the present disclosure.
Figure 6:
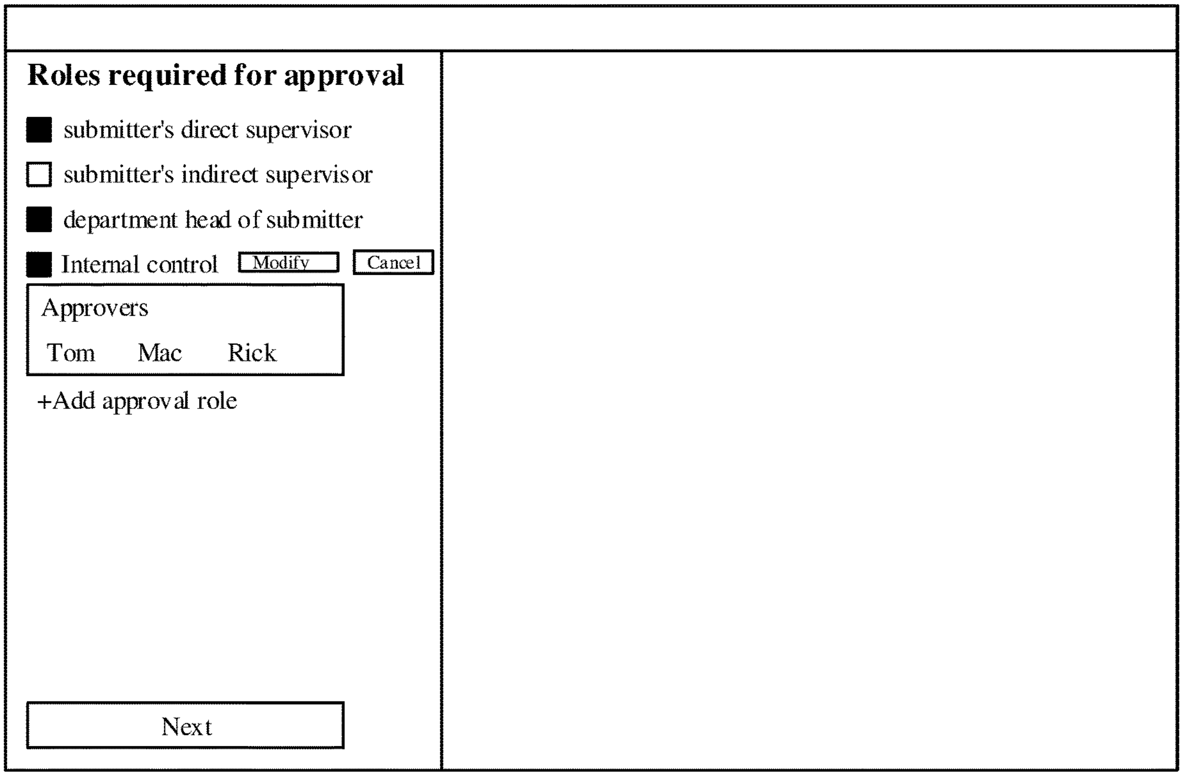
FIG. 6 is a schematic diagram of a generated new workflow item on a current page provided by an embodiment of the present disclosure.

In some embodiments, due to the fact that the preset workflow items may only correspond to some normal options, specific requirements are usually varied depending on specific workflows. As a result, it needs to create workflow items for target purposes. As shown in FIG. 2, the workflow items can include an option to create a new item, which can be set in the same area as other workflow items. When the operator triggers the option to create a new item, an item editing interface can be generated and used for editing the newly created workflow item. As shown in FIG. 5, in this item editing interface, the operator can select or enter the corresponding processing personnels for the workflow items, and name the newly created items. Among them, the selection or entry of the processing personnel is an addition operation. Here, a personnel list and other information can be entered by importing a preset entry table, and a relevant contact list and other information can also be searched and displayed so that the operator can also select from the contact list to complete the addition operation. After the operator completes the addition operation and selects or inputs the processing personnel for the newly created workflow item, personnel information of the processing personnel can be acquired and a new customized workflow item can be generated on the current page based on the personnel information, as shown in FIG. 6.

In some embodiments, the item editing interface includes an addition option, and the addition operation on the item editing interface includes: generating a personnel selection interface in response to a selection of the addition option; displaying a selection directory on the personnel selection interface, and determining a third selection operation for personnel options in the selection directory, wherein the selection directory is generated based on a preset personnel information table; and in response to a confirmation of the personnel option selected by the third selection operation, completing the addition operation.

Figure 7:
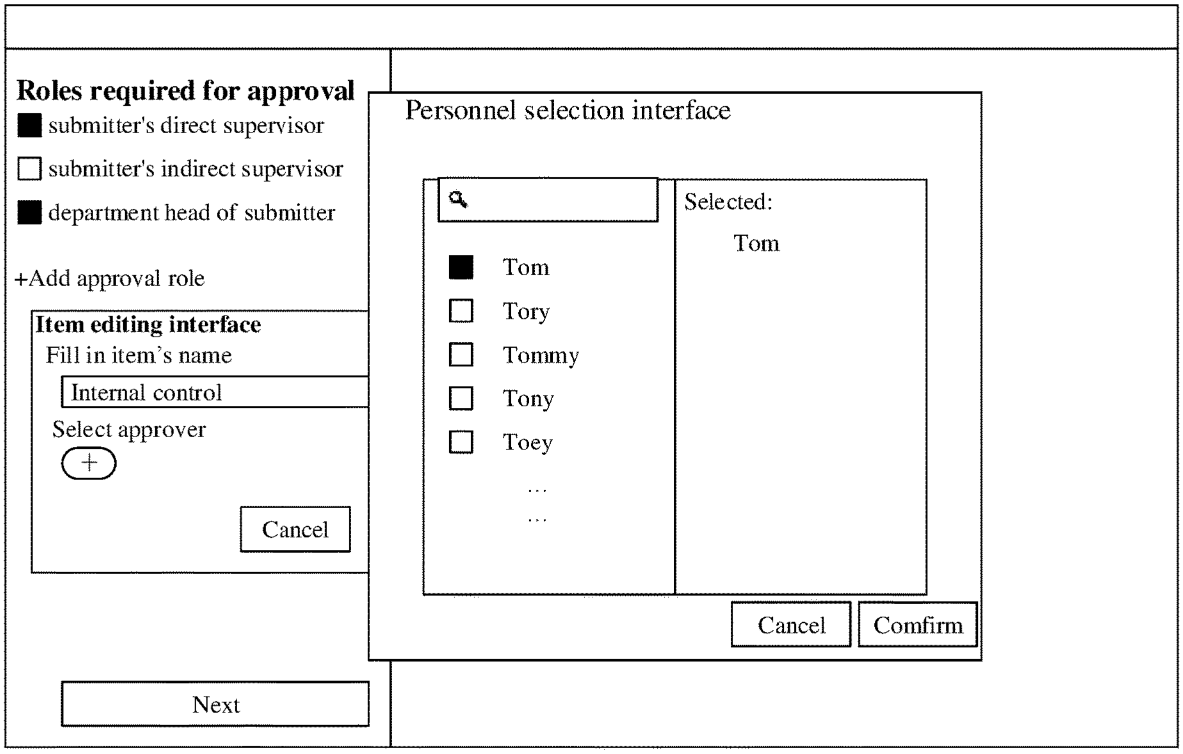
FIG. 7 is a schematic diagram of a displayed personnel selection interface provided by an embodiment of the present disclosure.

In some embodiments, as shown in FIG. 5, an addition option dedicated to add a processing personnel can be set in the item editing interface. After the operator selects the addition option, a personnel selection interface can be further generated, as shown in FIG. 7. In the personnel selection interface, a selection directory can be set for the operator to select a processing personnel. Each item in this directory is a personnel option, and the directory can be generated based on a preset personnel information table. The personnel information table can record personnel identifications (such as names) and corresponding personnel information, such as all members of an organization corresponding to the preset personnel information table or personnels in a certain group where the operator belongs. In specific embodiments, a search box can be set in the selection directory so that the operator can quick search and conveniently select the personnel. Then, the operator can perform a third selection operation on the selection directory. After selecting one or more personnel options from the selection directory, a confirmation operation similar to the previous embodiment can be performed. After the confirmation, the addition operation is completed. Finally, an icon of the selected personnel can be displayed next to the addition option on the item editing interface for the operator to view and confirm.

In some embodiments, the acquiring the personnel information corresponding to the addition operation includes: acquiring the personnel information corresponding to the personnel option selected by the third selection operation in the personnel information table.

In some embodiments, the personnel information can be directly obtained through the personnel information table, such as personnel name information, personnel duty information and the like, so that the information can be quicky acquired, which allows for quick generation of the workflow item.

In some embodiments, after the determination of the third selection operation for the personnel options in the selection directory, the method further includes: generating a preview of the selected personnel option in the personnel selection interface based on the third selection operation.

In some embodiments, in order to facilitate the operator to view which personnels have been selected by him/her from the selection directory, a specific area can be set in the personnel selection interface to display the personnel options that have been selected by the current operator for the convenience of the operator to view and confirm. As shown in FIG. 7, a dedicated area can be set next to the selection directory to display the selected personnel options.

In some embodiments, the item editing interface includes a name input box. Before the generating the new workflow item on the current page based on the personnel information, the method further includes: obtaining an input item name through the name input box, and naming the new workflow item based on the input item name.

In some embodiments, in order to better distinguish the newly created workflow items, as shown in FIG. 5, a name input box can be set in the item editing interface, and a name for the workflow item as input by the operator can be obtained through the name input box; that is, the new workflow item can be named by the item name.

In some embodiments, after generating the new workflow item on the current page based on the personnel information, the method further includes: generating a modification option for the new workflow item as generated; and in response to a triggering of the modification option, regenerating the item editing interface based on the workflow item corresponding to the modification option.

In some embodiments, in order to meet the operator's requirement for modifying the newly created workflow item, as shown in FIG. 6, a modification option can be generated simultaneously after the new workflow item is generated. When the operator triggers the modification option, the item editing interface can be reactivated, and corresponding content can be filled into the item editing interface based on the new workflow item for the operator to make modifications.

In some embodiments, after generating the modification option for the new workflow item as generated, the method further includes: generating a deletion option for the new workflow item as generated; and in response to a triggering of the deletion option, deleting the workflow item corresponding to the deletion option.

In some embodiments, in order to meet the operator's requirements for deleting the newly created workflow item, as shown in FIG. 6, a deletion option can be generated simultaneously after the new workflow item is generated. When the operator triggers the deletion option, the corresponding workflow item can be deleted.

In some embodiments, the condition options include a custom option. The determining the item condition for each selected item based on the second selection operation for the condition options includes: generating a creation option in response to a selection of the custom option; detecting whether a custom condition has been set in response to a triggering of the creation option; generating a combination interface in response to that at least one custom condition has been set, wherein the combination interface includes at least one group of condition selection boxes; obtaining a fourth selection operation for the at least one group of condition selection boxes; and in response to obtaining a confirmation of the combination interface, generating the item condition for the selected item corresponding to the custom option based on a condition relationship of each group of condition selection boxes determined by the fourth selection operation.

Figure 8:
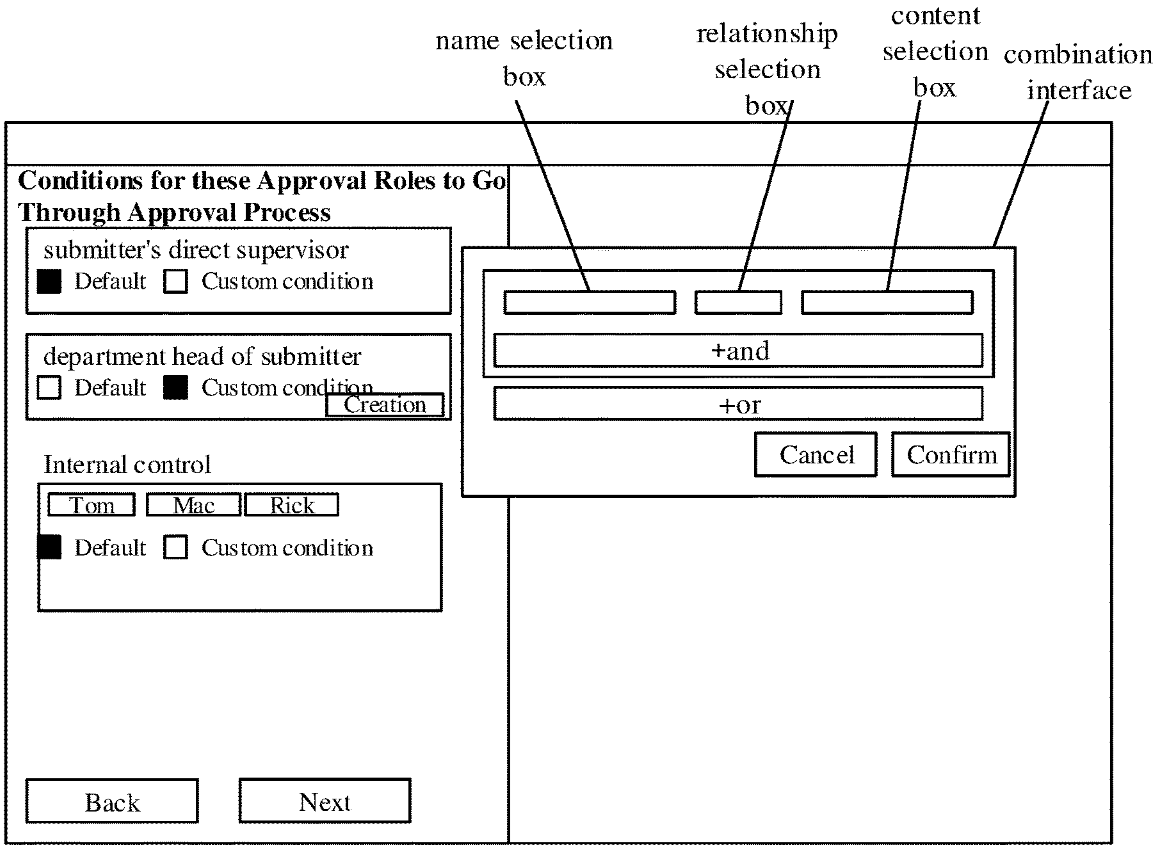
FIG. 8 is a schematic diagram of a combination interface generated in a current page provided by an embodiment of the present disclosure.

In some embodiments, the custom option is an option that allows for free settings of the operator; and of course, corresponding rules need to be followed during setting, to enable the custom option to be recognized. As shown in FIG. 8, after the operator selects the custom option (as shown in the figure, the approval option under conditions), a creation option will be created for the operator firstly. When the operator triggers this creation option, it will firstly determine whether there are any custom conditions that have been set. The custom conditions here may have been set by the operator, or may be set during the setting of the custom option for the previously selected item. Of course, there may also be no custom conditions.

In some embodiments, when there is already at least one custom condition, as shown in FIG. 8, a combination interface can be generated on the current interface, and includes at least one group of condition selection boxes. The condition selection box allows the operator to select an already set custom condition and to adjust the requirement for achieving the custom condition. For example, the name of the already set custom condition is "budget account", and the specific content is to choose between "commercial realization cost" and "non-commercial realization cost". Correspondingly, a group of condition selection boxes can be set with a name selection box, a relationship selection box, and a content selection box. When "Budget Account" is selected in the name selection box, the content selection box needs to be selected from one of "Commercialized Realizable Cost" and "Non-commercialized Realizable Cost". The relationship selection box can contain multiple relationship expressions, such as "equal to", "greater than", "less than", "greater than or equal to", and "less than or equal to". Here, "equal to" can be selected. Of course, the operator can also add any group of condition selection boxes through different operations. After corresponding selections for all the condition selection boxes have been completed, the fourth selection operation for the condition selection boxes is completed. That is to say, in some embodiments, a group of condition selection boxes at least includes: a name selection box, a relationship selection box, and a content selection box; the obtaining the fourth selection operation for the condition selection boxes includes: obtaining selections for the name selection box, the relationship selection box, and the content selection box, respectively, to complete the fourth selection operation. Of course, in specific embodiments, when selections are made for a group of condition selection boxes, if it is considered that the current custom conditions in the name selection box are not particularly accurate, modifications and adjustments can be made (e.g., setting a modification option next to each custom condition), and corresponding custom conditions can be adjusted in terms of their names, relationships and/or contents by generating a creation interface for custom conditions. Of course, if it is believed that some custom conditions are missing from the current name selection box, they can be added (e.g., setting newly added options), which can also be achieved by generating a creation interface for custom conditions.

Figure 9:
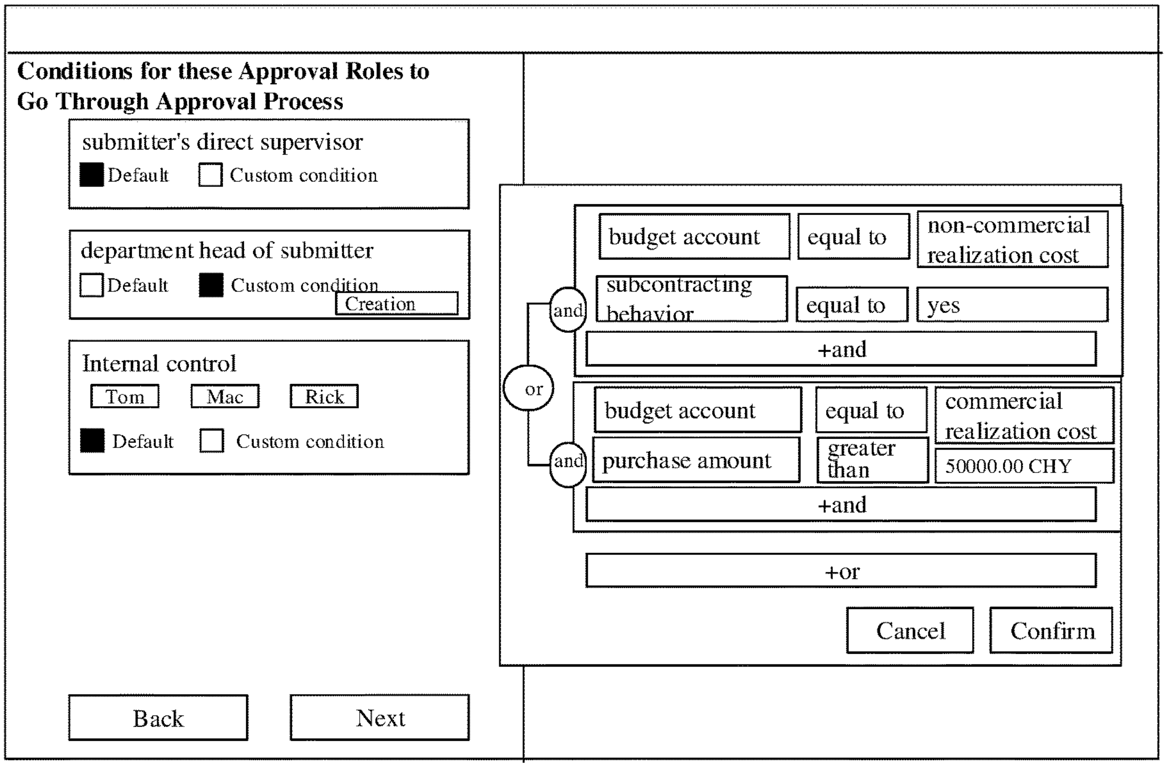
FIG. 9 is a schematic diagram of a combination interface after selecting a condition selection box provided by an embodiment of the present disclosure.

In some embodiments, in order to further enrich the conditions and make the custom conditions more specific, an "and" option and an "or" option can be set in the combination interface, as shown in FIGS. 8 and 9. In order to determine the relationship between groups of condition selection boxes, when the combination interface is generated, an initial group of condition selection boxes is set in a collection area, and the "and" option is set within the collection area while the "or" option is set outside the collection area. When the operator triggers the "and" option, it is considered that the operator wants to set a group of condition selection boxes in a parallel relationship with the condition selection boxes within the collection area, and the relationship between these two groups is an "and" relationship; correspondingly, new condition selection boxes are generated within the collection area. When the operator triggers the "or" option, it is considered that the operator wants to set a group of condition selection boxes in an alternative relationship with the condition selection boxes within the collection area, and the relationship between these two groups is an "or" relationship; correspondingly, new condition selection boxes are set outside the collection area and a new collection area is set for the new condition selection boxes. Of course, the "and" option can also be set in the new collection area. That is to say, in some embodiments, the condition selection boxes are located within a collection area, and an "and" option is set in the collection area; after generating the combination interface, the method further includes: generating a new group of condition selection boxes in response to obtaining a triggering of the "and" option, and setting the new group of condition selection boxes within the collection area. In some embodiments, the combination interface includes an "or" option; after generating the combination interface, the method further includes: generating a new group of condition selection boxes in response to obtaining a triggering of the "or" option, setting the new group of condition selection boxes in a new collection area, and generating a new "and" option in the new collection area.

Figure 10:
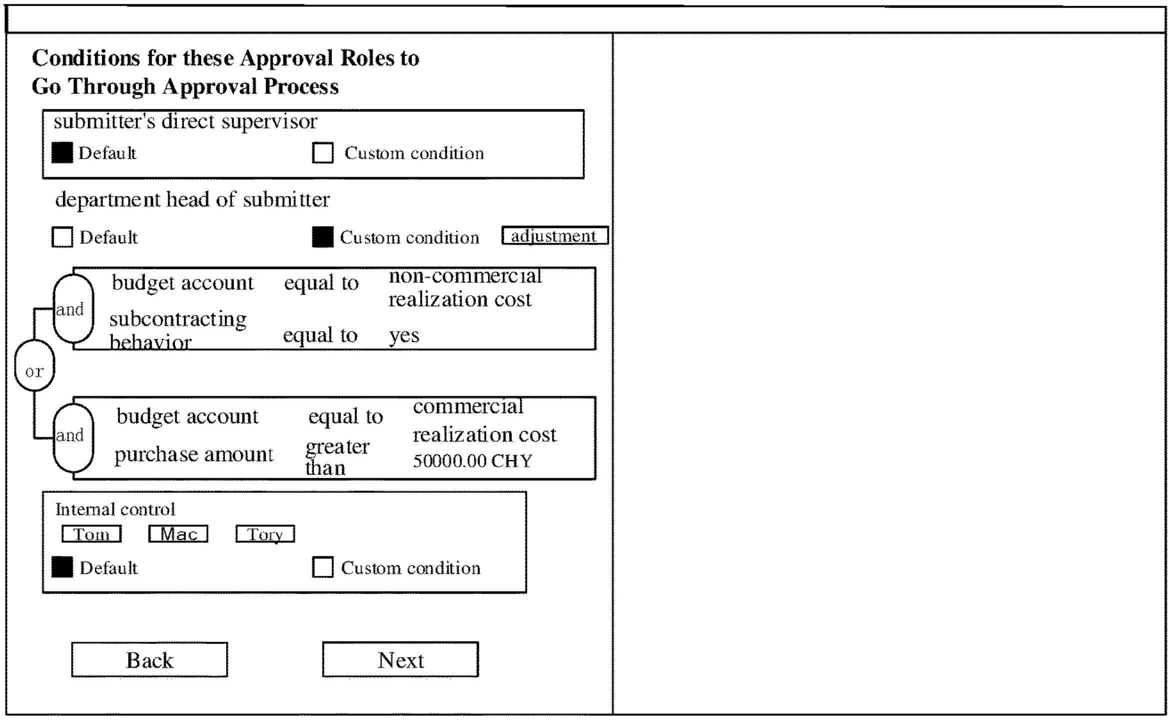
FIG. 10 is a schematic diagram of a custom condition displayed on a current page provided by an embodiment of the present disclosure.

Then, similar to the aforementioned embodiments, after completing the fourth selection operation for the condition selection boxes, a confirmation operation can also be performed. As shown in FIG. 8, it can also generate a selection area where "Next Step" can be set in the combination interface. When the operator triggers in this selection area, it is considered that the operator has confirmed the selected item. Then, determining a condition relationship of each group of condition selection boxes based on the operator's fourth selection operation. That is, determining a relationship between the name selection box and the content selection box through a content of the relationship selection box in each group of condition selection boxes. Finally, generating the corresponding item condition. In a specific embodiment, as shown in FIG. 10, when the operator sets a composite custom condition as an item condition based on the aforementioned embodiment as well as the "and" option and the "or" option, a corresponding preview image can be generated based on the relationship within each group of condition selection boxes and the relationship between groups of condition selection boxes, so that the operator can see more clearly whether the conditions as set meet the requirements. That is to say, in some embodiments, after generating the item condition of the selected item corresponding to the custom option based on the condition relationship of each group of condition selection boxes determined by the fourth selection operation, the method further includes: displaying a preview of the item condition on the current page based on the condition relationship of each group of condition selection boxes and an area division of each group of condition selection boxes by the collection area. The area division refers to a division of the condition selection boxes by the collection area, and a relationship between different groups of condition selection boxes is an "or" relationship.

In some embodiments, when there are no custom conditions yet, it is necessary to firstly create a custom option. That is, after detecting whether a custom condition has been set, the method further includes: generating a creation interface in response to an absence of the custom condition, wherein the creation interface includes multiple preset items; obtaining an input operation for each of the multiple preset items; and in response to a confirmation of the creation interface, generating the custom condition based on an input content of the input operation.

Figure 11:
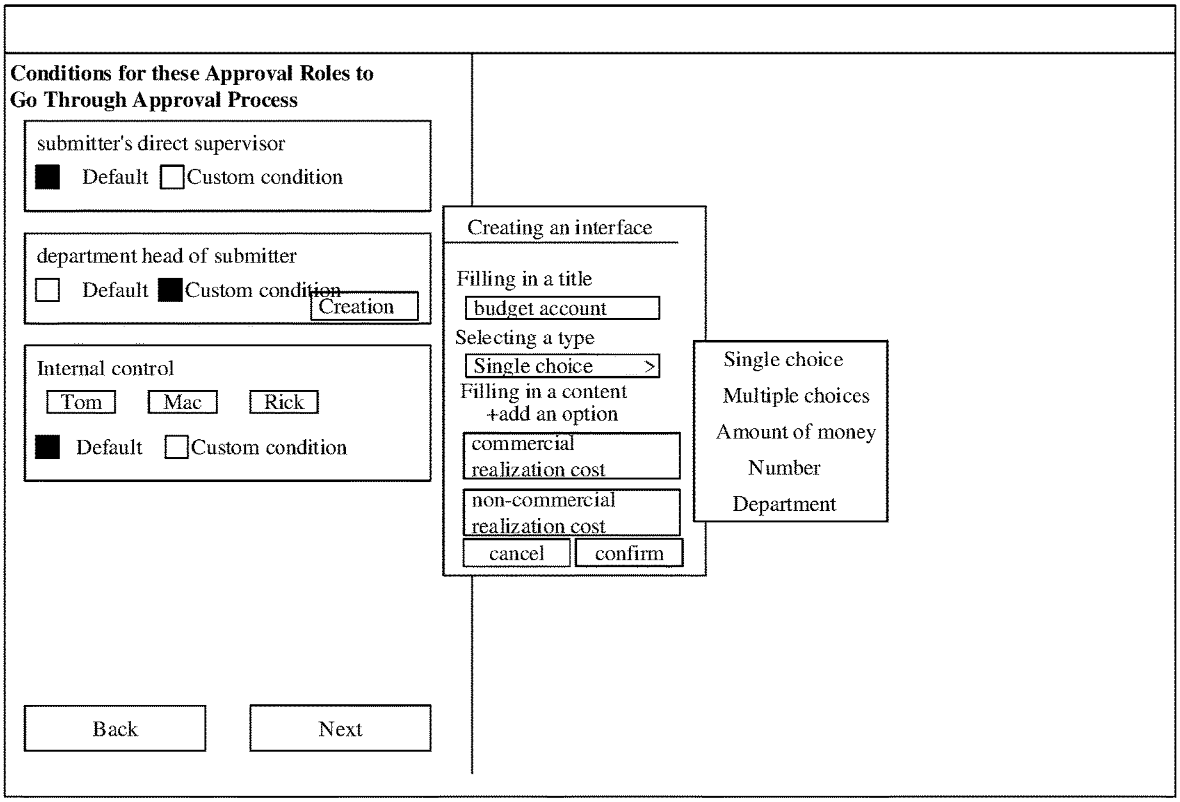
FIG. 11 is a schematic diagram of a creation interface generated in a current page provided by an embodiment of the present disclosure.

As shown in FIG. 11, a creation interface is generated in the current interface, and includes multiple preset items corresponding to custom conditions, such as a title filling item, a type selection item, and a content filling item. Then, input operations for these preset items can be a text input, a selection operation input, and so on. Specifically, for the title filling item and the content filling item that the text input is required, the text data correspondingly input by the operator can be directly obtained. For the type selection item that a selection needs to be made, a selection input operation based on the multiple options that pop up can be performed. Among them, the title filling item in the preset items represents the title or name of the newly created custom condition; the type selection item in the preset items represents the specific type corresponding to the newly created custom condition, such as amount of money, number, department, single choice, multiple choice, etc.; the content filling item in the preset items represents the specific content of the custom condition, such as the specific amount of money corresponding to the custom condition of the amount type. That is, in some embodiments, the preset items include a title filling item, a type selection item, and a content filling item; obtaining an input operation for each preset item includes: acquiring text input operations for the title filling item and the content filling item, as well as a selection input operation for any of type selection items.

Then, after the operator completes the input operations for the preset items in the creation interface, a confirmation operation can also be performed, as shown in FIG. 11. In the creation interface, a selection area of "Next Step" can also be set. When the operator triggers in this area, it is considered that the operator has confirmed the selected item. After the confirmation, corresponding custom conditions can be generated based on the specific input contents of the input operations.

In some embodiments, after generating the item condition of the selected item corresponding to the custom option, the method further includes: altering the creation option to an adjustment option; and in response to a triggering of the adjustment option, regenerating the combination interface based on the item condition corresponding to the adjustment option.

In some embodiments, in order to meet the operator's requirement for modifying the newly created item condition, as shown in FIG. 10, after selecting the custom condition as the item condition, an adjustment option for the custom condition can be generated at the same time. When the operator triggers the adjustment option, the combination interface can be reactivated, and corresponding content can be filled in or the combination interface can be regenerated based on the item condition, for the operator to modify and adjust.

In some embodiments, generating the condition options corresponding to each selected item on the current page includes: generating an item area corresponding to each selected item on the current page; and displaying the corresponding selected item and the condition options corresponding to the selected item in the item area.

In some embodiments, as shown in FIG. 3, in order to distinguish the selected items on the current page from each other, an item area can be divided for each selected item (i.e., the box containing a selected item and corresponding condition options as shown in FIG. 3), and the selected item and corresponding condition options can be set in this item area.

In some embodiments, after generating the item area corresponding to each selected item on the current page, the method further includes: in response to a dragging operation on any item area, adjusting a position relationship between the item area and other item areas according to a direction of the dragging operation.

In some embodiments, in order to facilitate the operator's modification of the order of selected items, by receiving the operator's dragging operation on an item area, the position relationship between the corresponding item area and other item areas can be adjusted. For example, as shown in FIG. 3, when the operator drags the second item area in the diagram, the position of the second item area will be exchanged with the position of the first item area if the dragging direction is an upward direction, and the position of the second item area will be exchanged with the position of the third item area if the dragging direction is a downward direction. In this way, the processing order of the corresponding selected items can be changed.

Figure 12A:
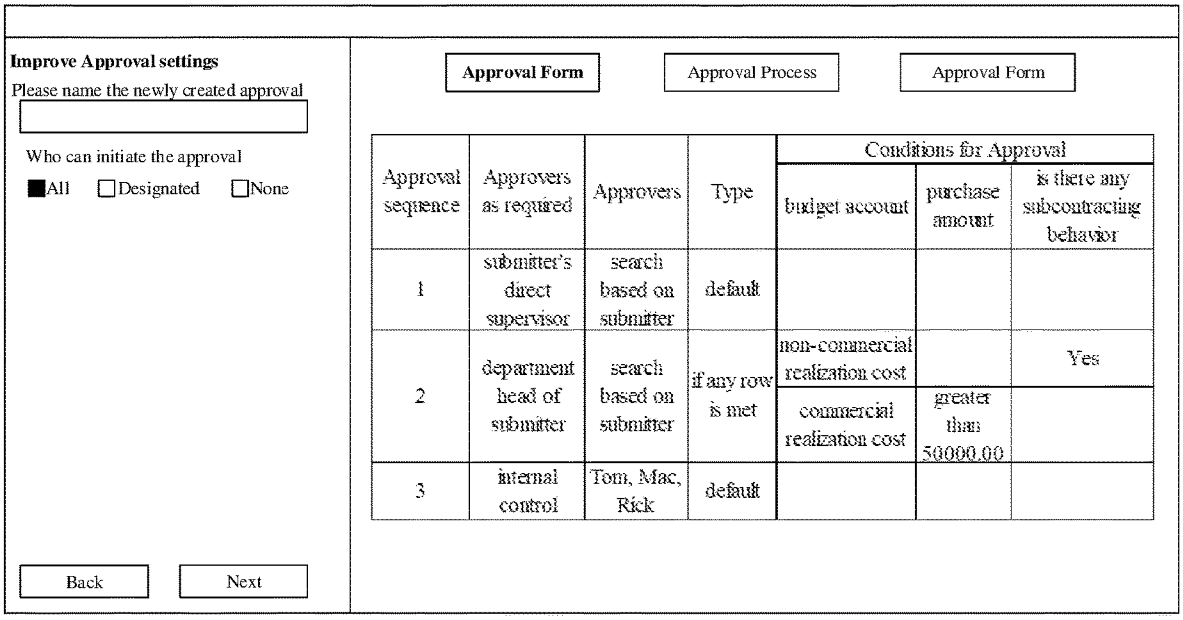
FIG. 12A is a schematic diagram of a table preview interface displayed on a current page provided by an embodiment of the present disclosure.
Figure 12B:
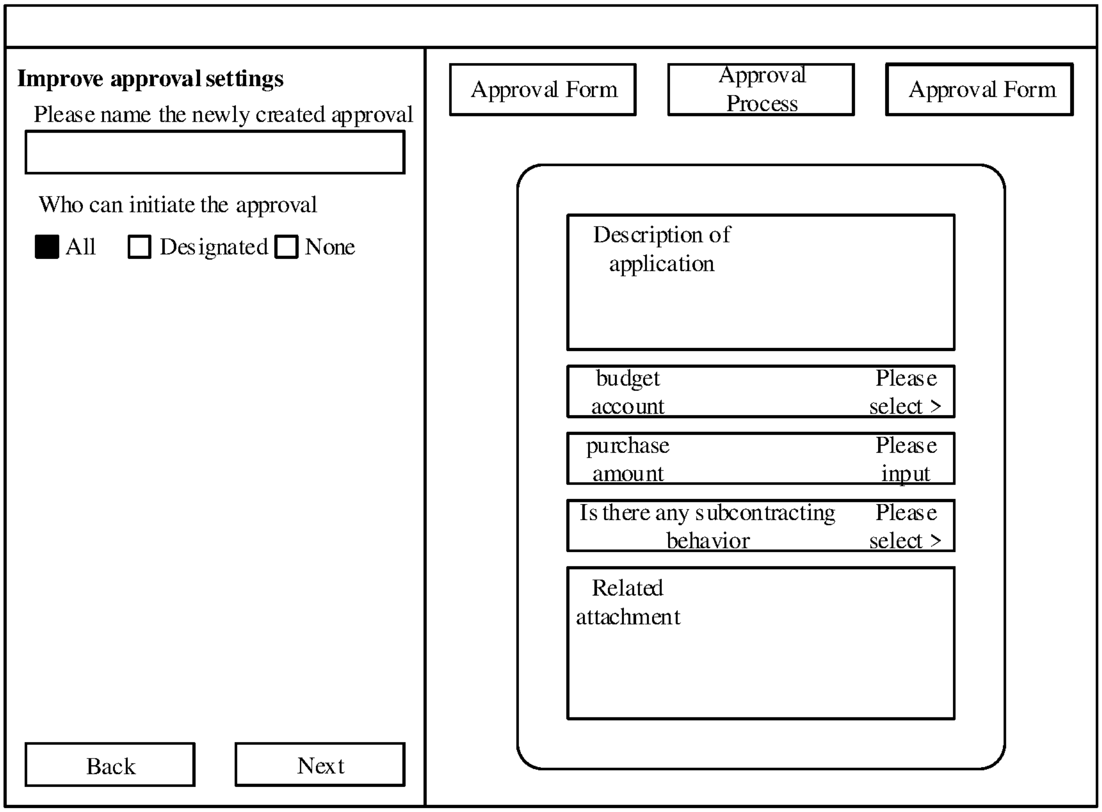
FIG. 12B is a schematic diagram of a form preview interface displayed on a current page provided by an embodiment of the present disclosure.
Figure 12C:
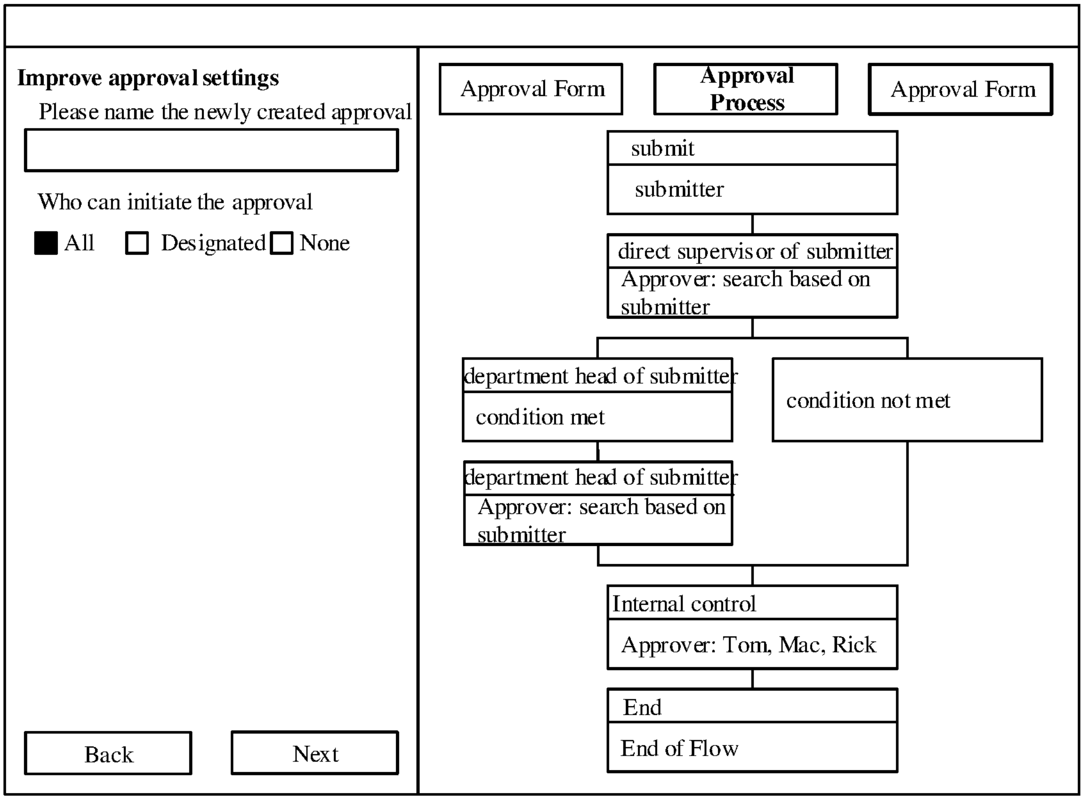
FIG. 12C is a schematic diagram of a flowchart preview interface displayed on a current page provided by an embodiment of the present disclosure.

In some embodiments, as shown in FIGS. 12A to 12C, the workflow preview interface includes a table preview interface, a form preview interface, and/or a flowchart preview interface. Among them, FIG. 12A shows the table preview interface displayed in the current interface; FIG. 12B shows the form preview interface displayed in the current interface; FIG. 12C shows the flowchart preview interface displayed in the current interface.

Then, for the newly created workflow, the name and corresponding permission of the workflow can be set. As shown in FIGS. 12A to 12C, on the current page, a name input box and a permission selection item can be generated; an text input for the name input box can be obtained to determine the specific name of the workflow (e.g., it may be named as "leave approval process", etc.), and a selection for permission selection items can be obtained determine which objects can execute the workflow (for example, which objects can execute the newly generated leave approval process; and when these objects have undergone the corresponding process, the workflow is executed). In some embodiments, after generating and displaying the workflow preview interface on the current page, the method further includes: generating a name input box and a permission selection item, obtaining a text input for the name input box, and obtaining a selection for the permission selection item.

In some embodiments, after displaying the workflow preview interface on the current page, the method further includes: generating association options, and determining whether a corresponding working document of workflow is present by a selection for the association options; and in response to an absence of the corresponding working document, generating the working document based on the selected item and the item condition.

In some embodiments, after the workflow is created, the corresponding working document can be associated, so that corresponding implementer can directly activate the workflow when executing the corresponding work according to the corresponding working document. For example, if the workflow is for leave approval, the corresponding working document is the leave regulation. When the implementer requests for leave based on the leave regulation, the leave approval is directly activated. In this case, the working document may not have been established, that is, the generation order of the workflow and the working document is not limited in a fixed manner. A working document may be generated firstly, or a workflow may be generated firstly. At this time, whether there is a working document can be determined by setting the association option, which can include two options of obtaining a working document link and creating a new working document. When the workflow is generated firstly, the operator will choose the option to create a new working document. Based on the selection of the association option, it is determined that there is no working document currently, and a working document can be automatically generated based on the selected items and item conditions corresponding to the workflow, which working document can be used as a reference for the operator to create working documents or used as the working document directly. Of course, if the working document is generated firstly, that is, the working document already exists when the workflow is created, the operator will choose the option of obtaining the working document link; then, it's determined that there is a working document currently based on the selection of the association option, and a selection interface will be directly generated and a location or path of the working document can be determined through this selection interface, in order to associate the workflow with the working document. That is, in some embodiments, after determining whether a corresponding working document of workflow is present, the method further includes: generating a document selection interface in response to a presence of corresponding working document and determining the working document through the document selection interface.

It is to be noted that the method of the embodiments in the present disclosure can be executed by a single device, such as a computer or server. The method of the embodiments in the present disclosure can also be applied in a distributed scenario, completed by multiple devices cooperating with each other. In this distributed scenario, one of these multiple devices can only perform one or more steps in the method of the embodiments in the present disclosure, and these multiple devices will interact with each other to complete the method.

It is to be noted that the specific embodiments of the present disclosure have been described above. Other embodiments are within the scope of the claims. In some cases, the actions or steps recorded in the claims may be executed in a different order from the above embodiments and still achieve the desired results. In addition, the process illustrated in the drawings does not necessarily require a specific or continuous sequence to achieve the desired results. In some implementations, multi-tasking and parallel processing are also possible or may be advantageous.

Based on the same concept and corresponding to any of the above embodiments, the present disclosure also provides an information processing device.

Figure 13:
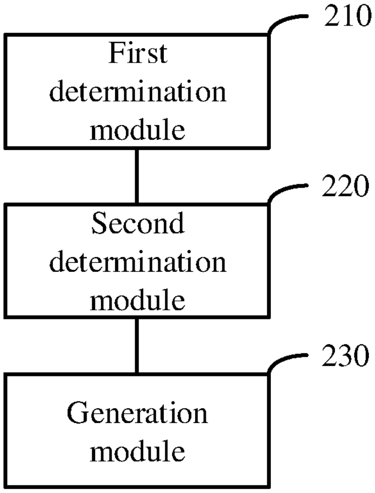
FIG. 13 is a schematic structural diagram of an information processing device provided by an embodiment of the present disclosure.

Referring to FIG. 13, the information processing device includes:

- a first determination module 210, configured to display at least one workflow item on a current page in response to a workflow creation operation, and determine a selected item based on a first selection operation for the at least one workflow item, wherein the at least one workflow item includes a corresponding processing personnel;
- a second determination module 220, configured to generate condition options corresponding to each selected item on the current page in response to a confirmation of the selected item, and determine an item condition for each selected item based on a second selection operation for the condition options; and
- a generation module 230, configured to generate and display a workflow preview interface on the current page based on the selected item and the item condition.

For the convenience of description, the above device is divided into various modules based on their functions. Of course, in implementing the embodiments of the present disclosure, the functions of various modules can be implemented in one or more software and/or hardware.

The device of the above embodiment is used to implement the corresponding information processing method in the previously described embodiments, and has the beneficial effects of the corresponding method embodiments, which will not be further repeated here.

In some embodiments, the at least one workflow item includes a newly created item; and

- the first determination module 210 is further configured to: generate an item editing interface in response to a triggering of the newly created item; and in response to an addition operation on the item editing interface, acquire personnel information corresponding to the addition operation, and generate a new workflow item on the current page based on the personnel information.

In some embodiments, the item editing interface includes an addition option; and

- the first determination module 210 is further configured to:
- generate a personnel selection interface in response to a selection of the addition option;
- display a selection directory on the personnel selection interface and determine a third selection operation for personnel options in the selection directory, wherein the selection directory is generated based on a preset personnel information table; and
- in response to a confirmation of the personnel option selected by the third selection operation, complete the addition operation.

In some embodiments, the first determination module 210 is also configured to:

- obtain the personnel information corresponding to the personnel option selected by the third selection operation in the personnel information table.

In some embodiments, the first determination module 210 is also configured to:

- generate a preview of the selected personnel option in the personnel selection interface according to the third selection operation.

In some embodiments, the item editing interface includes a name input box; and

- the first determination module 210 is further configured to:
- obtain an item name input through the name input box, and name the new workflow item based on the item name.

In some embodiments, the first determination module 210 is also configured to:

- generate a modification option for the new workflow item as generated; and in response to a triggering of the modification option, regenerate the item editing interface based on the workflow item corresponding to the modification option.

In some embodiments, the first determination module 210 is also configured to:

generate a deletion option for the new workflow item as generated; and in response to a triggering of the deletion option, delete the workflow item corresponding to the deletion option.

In some embodiments, the condition options include a custom option; and the second determination module 220 is also configured to:

generate a creation option in response to a selection of the custom option;

detect whether a custom condition has been set in response to a triggering of the creation option;

generate a combination interface in response to that at least one custom condition has been set, wherein the combination interface includes at least one group of condition selection boxes;

obtain a fourth selection operation for the at least one group of condition selection boxes; and in response to obtaining a confirmation of the combination interface, generate the item condition for the selected item corresponding to the custom option based on a condition relationship of each group of condition selection boxes determined by the fourth selection operation.

In some embodiments, the second determination module 220 is also configured to:

in response to that the custom condition has not been set, generate a creation interface, wherein the creation interface includes multiple preset items;

obtain an input operation for each of the multiple preset items; and in response to a confirmation of the creation interface, generate a custom condition based on an input content of the input operation.

In some embodiments, the preset items include: a title filling item, a type selection item, and a content filling item; and the second determination module 220 is also configured to:

obtain text input operations for the title filling item and the content filling item, as well as a selection input operation for any of the type selection item.

In some embodiments, a group of condition selection boxes at least includes: a name selection box, a relationship selection box, and a content selection box; and the fourth selection operation includes:

obtaining selections for the name selection box, the relationship selection box, and the content selection box, respectively, to complete the fourth selection operation.

In some embodiments, the condition selection box is located within a collection area; and in the collection area, an "and" option is set;

the second determination module 220 is also configured to:

in response to obtaining a triggering of the "and" option, generate a new group of condition selection boxes, and set the new group of condition selection boxes within the collection area.

In some embodiments, the combination interface includes an "or" option; and the second determination module 220 is also configured to:

in response to obtaining a triggering of the "or" option, generate a new group of condition selection boxes, set the new group of condition selection boxes in a new collection area, and generate a new "and" option in the new collection area.

In some embodiments, the second determination module 220 is also configured to:

display a preview of the item condition on the current page based on the condition relationship of each group of condition selection boxes and an area division of each group of condition selection boxes by the collection area.

In some embodiments, the second determination module 220 is also configured to:

alter the creation option to an adjustment option; and in response to a triggering of the adjustment option, regenerate the combination interface based on the item condition corresponding to the adjustment option.

In some embodiments, the second determination module 220 is also configured to:

generate an item area corresponding to each selected item on the current page; and display the corresponding selected item and the condition options corresponding to the selected item in the item area.

In some embodiments, the second determination module 220 is also configured to:

in response to a dragging operation on any item area, adjust a position relationship between the item area and other item areas according to a direction of the dragging operation.

In some embodiments, the generation module 230 is also configured to:

generate an association option, and determine whether a corresponding working document of workflow is present by a selection of the association option; and in response to an absence of the corresponding working document, generate the working document based on the selected item and the item condition.

In some embodiments, the generation module 230 is also configured to:

in response to a presence of the corresponding working document, generate a document selection interface and determine the working document through the document selection interface.

In some embodiments, the generation module 230 is also configured to:

generate a name input box and a permission selection item, obtain a text input for the name input box, and obtain a selection for the permission selection item.

In some embodiments, the workflow preview interface includes a table preview interface, a form preview interface, and/or a flowchart preview interface.

Based on the same concept and corresponding to the method of any of the above embodiments, the present disclosure also provides an electronic apparatus, including a memory, a processor, and a computer program stored in the memory and executable on the processor. The processor implements the information processing method in any one of the above embodiments when executing the computer program.

Figure 14:
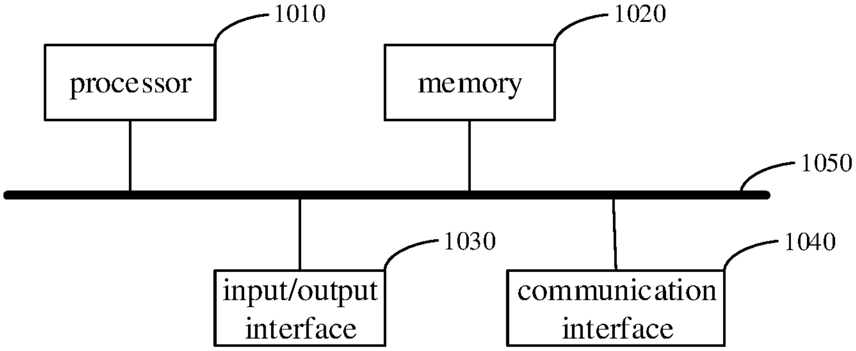
FIG. 14 is a schematic structural diagram of an electronic apparatus provided by an embodiment of the present disclosure.

FIG. 14 shows a more specific diagram illustrating a hardware structure of an electronic apparatus provided by this embodiment. The electronic apparatus may include a processor 1010, a memory 1020, an input/output interface 1030, a communication interface 1040, and a bus 1050. The processor 1010, the memory 1020, the input/output interface 1030, and the communication interface 1040 achieve communicative connections among each other within the electronic apparatus through the bus 1050.

The processor 1010 can be implemented by using a universal central processing unit (CPU), a microprocessor, an application specific integrated circuit (ASIC), or one or more integrated circuits to execute related programs to implement the technical solution provided in the embodiments of this specification.

The memory 1020 can be implemented in the form of ROM (Read Only Memory), RAM (Random Access Memory), static storage devices, dynamic storage devices, etc. The memory 1020 can store operating systems and other application programs. When implementing the technical solution provided in the embodiments of the present specification through software or firmware, the relevant program codes are saved in the memory 1020 and called and executed by the processor 1010.

The input/output interface 1030 is configured to connect input/output modules for information input and output. The input/output module can be configured as a component in the apparatus (not shown in the figures), or can be externally coupled to the electronic apparatus to provide corresponding functions. The input device can include a keyboard, a mouse, a touch screen, a microphone, various sensors, etc., while the output device can include a display, a speaker, a vibrator, an indicator light, etc.

The communication interface 1040 is configured to connect communication modules (not shown in the figures) to achieve communicative interaction between this electronic apparatus and other devices. The communication module can communicate through wired means (such as USB, network cable, etc.), or through wireless means (such as mobile network, WIFI, Bluetooth, etc.).

The bus 1050 includes a path that transmits information between various components of the electronic apparatus, such as the processor 1010, the memory 1020, the input/output interface 1030, and the communication interface 1040.

It is to be noted that although the above electronic apparatus only shows the processor 1010, the memory 1020, the input/output interface 1030, the communication interface 1040, and the bus 1050, in the specific implementation process, the electronic apparatus can also include other components necessary for normal operation. In addition, those skilled in the art can understand that the above electronic apparatus can only include the necessary components to implement the embodiments of this specification, without necessarily including all the components shown in the figures.

The electronic apparatus of the above embodiment is used to implement the corresponding information processing method in any one of the above embodiments, and has the beneficial effects of the corresponding method embodiments. It will not be further repeated here.

Based on the same concept and corresponding to the method of any of the above embodiments, the present disclosure also provides a non-transient computer-readable storage medium, which stores computer instructions for enabling the computer to execute the information processing method described in any one of the above embodiments.

The computer-readable medium of this embodiment includes permanent and non-permanent, movable and non-movable medium, and the information storage can be achieved by any method or technology. The information can be computer-readable instructions, data structures, program modules, or other data. Examples of storage medium for computers include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc read-only memory (CD-ROM), digital multifunctional optical discs (DVDs) or other optical storage, magnetic cassette tapes, magnetic tape disk storage, or other magnetic storage devices, or any other non-transmission medium, which can be used to store information that can be accessed by computing devices.

The computer instructions stored in the storage medium of the above embodiment are used to enable the computer to execute the information processing method as described in any previous embodiment, and have the beneficial effects of the corresponding method embodiments, which will not be repeated here.

One of ordinary skilled in the art should understand that the discussion of any of the above embodiments is only illustrative and not intended to imply that the scope of the present disclosure (including the claims) is limited to these examples. Under the ideas of the present disclosure, the technical features of the above embodiments or different embodiments can also be combined, and the steps can be implemented in any order. There are many other changes in different aspects of the embodiments of the present disclosure as described above, which are not provided in detail for clarity.

In addition, to simplify the explanation and discussion, and to avoid obscuring the embodiments of the present disclosure, well-known power/ground connections with integrated circuit (IC) chips and other components may or may not be shown in the provided drawings. In addition, the devices can be shown in the form of block diagrams to avoid obscuring the embodiments of the present disclosure, which also takes into account the fact that the details of the implementations of these block diagram devices are highly dependent on the platform on which the embodiments of the present disclosure are to be implemented (i.e., these details are to be fully within the understanding range of those skilled in the art). In the case where specific details (such as circuits) have been elaborated to describe exemplary embodiments of the present disclosure, it is apparent to those skilled in the art that the embodiments of the present disclosure can be implemented without these specific details or with changes in these specific details. Therefore, these descriptions are to be considered explanatory rather than restrictive.

Although the present disclosure has been described in conjunction with specific embodiments, based on the previous description, many substitutions, modifications, and variations of these embodiments will be apparent to one of ordinary skilled in the art. For example, other memory architectures (such as dynamic RAM (DRAM)) can use the discussed embodiments.

The embodiments of the present disclosure are intended to cover all such substitutions, modifications, and variations that fall within the broad scope of the claims. Therefore, any omissions, modifications, equivalent substitutions, improvements, etc. made within the spirit and principles of the embodiments of the present disclosure shall be included in the scope of the present disclosure.

What is claimed is:

1. An information processing method, comprising:

displaying at least one workflow item on a current page in response to a workflow creation operation, and determining a selected item based on a first selection operation for the at least one workflow item, wherein each of the at least one workflow item comprises a corresponding processing personnel;

generating condition options corresponding to each selected item on the current page in response to a confirmation of the selected item, and determining an item condition for each selected item based on a second selection operation for the condition options, wherein the condition options comprise a custom option;

generating a combination interface comprising at least one group of condition selection boxes;

receiving user input associated with the at least one group of condition selection boxes;

generating the item condition associated with the custom option; and generating and displaying a workflow preview interface on the current page based on the selected item and the item condition.

2. The method according to claim 1, wherein the at least one workflow item comprises a newly created item;

the displaying the at least one workflow item on the current page comprises:

generating an item editing interface in response to a triggering of the newly created item; and acquiring personnel information corresponding to an addition operation in response to the addition operation on the item editing interface, and generating a new workflow item on the current page based on the personnel information.

3. The method according to claim 2, wherein the item editing interface comprises an addition operation;

the addition operation on the item editing interface comprises:

generating a personnel selection interface in response to a selection of the addition operation;

displaying a selection directory on the personnel selection interface and determining a third selection operation for personnel options in the selection directory, wherein the selection directory is generated based on a preset personnel information table; and completing the addition operation in response to a confirmation of the personnel option selected by the third selection operation.

4. The method according to claim 3, wherein the acquiring the personnel information corresponding to the addition operation comprises:

acquiring the personnel information corresponding to the personnel option selected by the third selection operation in the personnel information table.

5. The method according to claim 3, wherein after the determining the third selection operation for the personnel options in the selection directory, the method further comprises:

generating a preview of the selected personnel option on the personnel selection interface according to the third selection operation.

6. The method according to claim 2, wherein the item editing interface comprises a name input box;

before the generating the new workflow item on the current page based on the personnel information, the method further comprises:

acquiring an item name input through the name input box, and naming the new workflow item based on the item name.

7. The method according to claim 2, wherein after the generating the new workflow item on the current page based on the personnel information, the method further comprises:

generating a modification option for the generated new workflow item; and regenerating the item editing interface based on the generated new workflow item corresponding to the modification option in response to a triggering of the modification option.

8. The method according to claim 7, wherein after the generating the modification option for the generated new workflow item, the method further comprises:

generating a deletion option for the generated new workflow item; and deleting the generated new workflow item corresponding to the deletion option in response to a triggering of the deletion option.

9. The method according to claim 1, wherein determining the item condition comprises the custom option further comprises:

generating a creation option on the current page in response to a selection of the custom option; and detecting whether a custom condition has been set in response to a triggering of the creation option.

10. The method according to claim 9, wherein after the detecting whether the custom condition has been set, the method further comprises:

generating a creation interface in response to that the custom condition has not been set, wherein the creation interface comprises a plurality of preset items;

acquiring an input operation for each of the plurality of preset items; and generating the custom condition based on an input content of the input operation in response to a confirmation of the creation interface.

11. The method according to claim 10, wherein the preset items comprise:

a title filling item, a type selection item, and a content filling item;

the acquiring the input operation for each of the plurality of preset items comprises:

acquiring text input operations for the title filling item and the content filling item, respectively, and acquiring a selection input operation for any of the type selection item.

12. The method according to claim 9, wherein one of the at least one group of condition selection boxes at least comprises: a name selection box, a relationship selection box, and a content selection box, and wherein receiving the user input further comprises:

acquiring selections for the name selection box, the relationship selection box, and the content selection box, respectively.

13. The method according to claim 9, wherein the at least one group of condition selection boxes is located in a collection area, and an "and" option is set in the collection area;

after the generating the combination interface, the method further comprises:

generating a new group of condition selection boxes in response to acquiring a triggering of the "and" option, and setting the new group of condition selection boxes in the collection area.

14. The method according to claim 13, further comprising:

generating, after the generating the combination interface, a new group of condition selection boxes in response to acquiring a triggering of an "or" option, setting the new group of condition selection boxes in a new collection area, and generating a new "and" option in the new collection area.

15. The method according to claim 14, wherein after the generating the item condition associated with the custom option, the method further comprises:

displaying a preview of the item condition on the current page according to the received user input, and an area division of each group of condition selection boxes by the collection area.

16. The method according to claim 9, wherein after the generating the item condition associated with the custom option, the method further comprises:

altering the creation option to an adjustment option; and regenerating the combination interface based on the item condition corresponding to the adjustment option in response to a triggering of the adjustment option.

17. The method according to claim 1, wherein the generating the condition options corresponding to each selected item on the current page comprises:

generating an item area corresponding to each selected item on the current page; and displaying the corresponding selected item and the condition options corresponding to the selected item in the item area.

18. The method according to claim 17, wherein after the generating the item area corresponding to each selected item on the current page, the method further comprises:

in response to a dragging operation on any item area, adjusting a position relationship between the any item area and other item areas according to a direction of the dragging operation.

19. The method according to claim 1, wherein after the displaying the workflow preview interface on the current page, the method further comprises:

generating an association option and determining whether a corresponding working document for workflow is present through a selection of the association option; and generating the working document based on the selected item and the item condition in response to an absence of the corresponding working document.

20. An information processing device, comprising:

a processor and a memory, wherein the memory stores a computer program, and wherein the computer program upon execution by the processor causes the processor to implement operations comprising:

displaying at least one workflow item on a current page in response to a workflow creation operation, and determine a selected item based on a first selection operation for the at least one workflow item, wherein the at least one workflow item comprises a corresponding processing personnel;

generating condition options corresponding to each selected item on the current page in response to a confirmation of the selected item, and determine an item condition for each selected item based on a second selection operation for the condition options, wherein the condition options comprise a custom option;

generating a combination interface comprising at least one group of condition selection boxes;

receiving user input associated with the at least one group of condition selection boxes;

generating the item condition associated with the custom option; and generating and displaying a workflow preview interface on the current page based on the selected item and the item condition.

* * * * *